United States Patent
Minegishi

[11] Patent Number: 5,920,608
[45] Date of Patent: Jul. 6, 1999

[54] MEASUREMENT DEVICE FOR COMMUNICATION

[75] Inventor: Toshiyuki Minegishi, Tokyo, Japan

[73] Assignee: Advantest Corporation, Tokyo, Japan

[21] Appl. No.: 08/866,537

[22] Filed: May 30, 1997

[30] Foreign Application Priority Data

May 31, 1996 [JP] Japan ..................................... 8-138775

[51] Int. Cl.$^6$ .............................. H04M 1/24; H04M 3/08; H04M 3/22
[52] U.S. Cl. ..................................... 379/1; 379/9; 379/29; 379/32; 370/250
[58] Field of Search .............................. 379/1, 9, 10, 12, 379/15, 27, 29, 32, 34; 370/241, 250

[56] References Cited

U.S. PATENT DOCUMENTS 5,373,501  12/1994  Roland ...................................... 379/12

Primary Examiner—Curtis A. Kuntz
Assistant Examiner—Binh K. Tieu
Attorney, Agent, or Firm—Knobbe, Martens, Olson & Bear, LLP

[57] ABSTRACT

A measurement device for communication purposes is disclosed that enables a plurality of differing measurement functions, and moreover, the addition of measurement functions. A measurement device for communication that determines the quality of communication in communication devices making up a communication system by way of communication lines includes interface function boards that regulate connections between communication devices by way of communication lines, a plurality of measurement function boards provided for each test item that perform communication tests, and an exchange function unit that connect these boards. The device is constructed so as to allow addition of a measurement function board equipped with new measurement functions, the exchange function unit establishing connections between the added function board and interface function boards.

5 Claims, 9 Drawing Sheets

Fig.1 (a) (prior art)
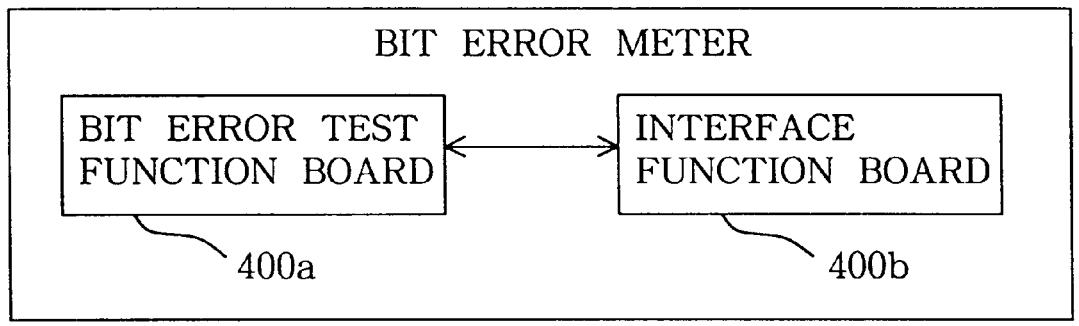
Fig.1 (b) (prior art)
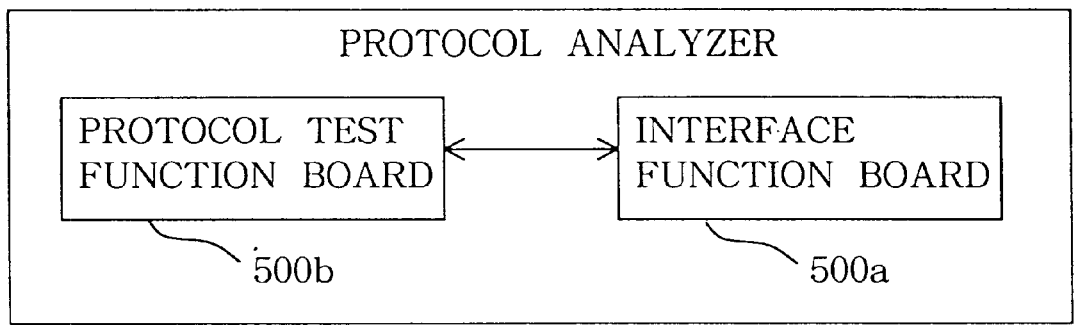

110 : LAYER 2/3 BOARD
111 : HDLC SIMULATOR
112 : HDLC MONITOR
113 : VOICE MONITOR
114 : R/V.110 MONITOR

120 : LAYER1 BOARD
121 : INTERFACE (I.431)
122 : INTERFACE (I.430)
123 : INTERFACE (X.21)
124 : INTERFACE (V.35)
130 : MESUREMENT DATA BUS

☐ : BITS OF THE 8 − BIT BUS WIDTH EMPLOYED

☐ : BITS OF THE 8 − BIT BUS WIDTH EMPLOYED

100 : COMMUNICATION MEASUREMENT DEVICE
101 : MEASUREMENT FUNCTION BOARD
102 : EXCHANGE FUNCTION UNIT
103a,103b : INTERFACE FUNCTION BOARD
200 : MEASUREMENT FUNCTION CONTROLLER
300 : COMMUNICATION DEVICE

MEASUREMENT DEVICE FOR COMMUNICATION

BACKGROUND OF THE INVENTION

1. Field of the Invention

The present invention relates to a measurement device for communication that measures the quality of communication in communication equipment such as a PBX (private branch exchange) that makes up a communication system via communication lines (including telephone lines).

2. Description of the Related Art

Measurement devices for communication have conventionally been manufactured for each specific type of measurement function. Examples of measurement devices for communication include the bit error meter shown in FIG. 1(a) in which bit error test function board 400a and interface function board 400b are interconnected; and a protocol analyzer such as shown in FIG. 1(b) in which protocol test function board 500a and interface function board 500b are interconnected; and these measurement devices are each used according to the tested item. Consequently, when a plurality of different test items such as bit error testing or protocol testing were to be measured, bit error meters and protocol analyzers were individually provided to conduct each respective test. Here, "interface function" refers to the function of converting to various types of communication interfaces, and "measurement function" refers to functions used in actual measurement such as bit error testing and protocol testing.

As described hereinabove, conducting communication tests on a communication device generally requires a plurality of measurement functions. In digital lines (such as ISDN lines), signaling channels exist independent of data channels (such as a channel for voice), and the test functions employed also differ accordingly. For example, a protocol testing function is employed for controlling calls in a signaling channel, and a bit error testing function is employed that can confirm the connection state in a data channel. As a result, judging the quality of one communication device has necessitated the provision of a plurality of communication measurement devices such as a bit error meters and protocol analyzers. For example, conducting communication tests on a PBX necessitated the connection of a plurality of measurement devices to PBX 600 as shown in FIG. 2. This figure shows a case in which bit error test function 602a and protocol test function 603a are connected by way of interface 601a, and in addition, bit error test function 602b and protocol test function 603b are connected by way of interface 601b.

As described hereinabove, because a prior-art measurement device for communication purposes had only one test function, measurement devices such as bit error meters and protocol analyzers had to be provided for each type of test item, and this necessity placed a great burden on the user. In addition, prior-art communication measurement devices did not allow compound testing by which, for example, a data channel could be correctly controlled by the signaling channel in a case in which a signaling channel and a data channel exist separately in one interface through time division multiplexing such as in an ISDN line.

In addition, although new applications and formats are constantly being developed in the field of communications, prior-art measurement devices for communication purposes have not allowed for the addition of measurement functions for new applications and formats, and as result, there has been a need for the development of a measurement device that can accommodate additional functions.

SUMMARY OF THE INVENTION

The object of the present invention is to provide a measurement device for communication purposes that solves the above-described problems, that is provided with a plurality of different measurement functions, and moreover, that allows the addition of new measurement functions and that can execute the above-described compound testing.

To achieve the above-described object, the measurement device for communication of the present invention determines the communication quality of communication device making up a communication system by way of communication lines and includes:

- an interface function board that regulates connections with the communication device by way of the communication lines;
- a plurality of measurement function boards provided for every test item for the communication device that perform communication tests; and
- an exchange function unit that connects the interface function board and the plurality of measurement function boards.

In the description above, the interface function board may be made up of a plurality of interface function boards provided corresponding to the types of communication lines, and the exchange function unit may establish connections between each interface function board and each measurement function board according to test items.

Moreover, the measurement device of the present invention may be constructed so as to allow the addition of a measurement function board equipped with new measurement functions, and the exchange function unit may establish connections between an added function board and the interface function boards.

In addition, the measurement device of the present invention may include a function board provided with interface functions that, using the interface function boards, receive control signals inputted from the outside for controlling communication tests by each of the measurement function boards; and may be constructed so as to enable remote control from the outside by means of the control signals.

Through the above-described construction, the present invention is provided with measurement function boards corresponding to each of a variety of test items such as bit error testing, protocol testing, thereby eliminating the need to provide every type of measurement device such as bit error meters or protocol analyzers when testing communication-as in the prior art.

Moreover, exchange function unit is capable of connecting each interface function board and each measurement function board according to test item, and when a new measurement function board is added, the added measurement function board and each interface function board can therefore be connected. For example, the connection of a plurality of measurement function boards to an interface function board allows measurement of a plurality of test items for one interface. If a plurality of interface function boards are connected to a measurement function board, the measurement of one item can be conducted at a plurality of interfaces, thereby enabling compound testing and overcoming one of the problems encountered in the prior art.

By means of the above-described construction, the present invention has the effect of enabling the measurement of a plurality of test items for one interface.

In addition, the measurement of one item can be conducted from a plurality of interfaces, and the invention therefore has the effect of enabling compound testing such as determining at a signaling channel whether a data channel is being correctly controlled in an ISDN line.

Finally, the present invention allows the addition of a new measurement function board, and therefore has the effect of accommodating new applications or methods relating to the communication system.

The above and other objects, features, and advantages of the present invention will become apparent from the following description based on the accompanying drawings which illustrate examples of preferred embodiments of the present invention.

BRIEF DESCRIPTION OF THE DRAWINGS

FIG. 1(a) is a block diagram showing a bit error measurement device, and FIG. 1(b) is a block diagram showing a protocol analyzer.

DETAILED DESCRIPTION OF THE PREFERRED EMBODIMENTS

Embodiments of the present invention will next be explained with reference to the accompanying figures.

Figure 2:
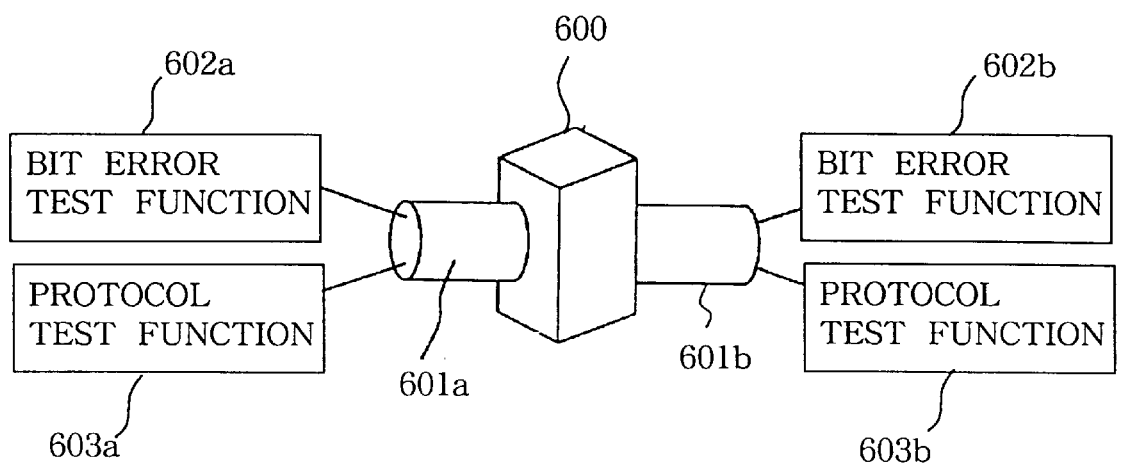
FIG. 2 is an explanatory view of the measurement of communication testing in a PBX.
Figure 3:
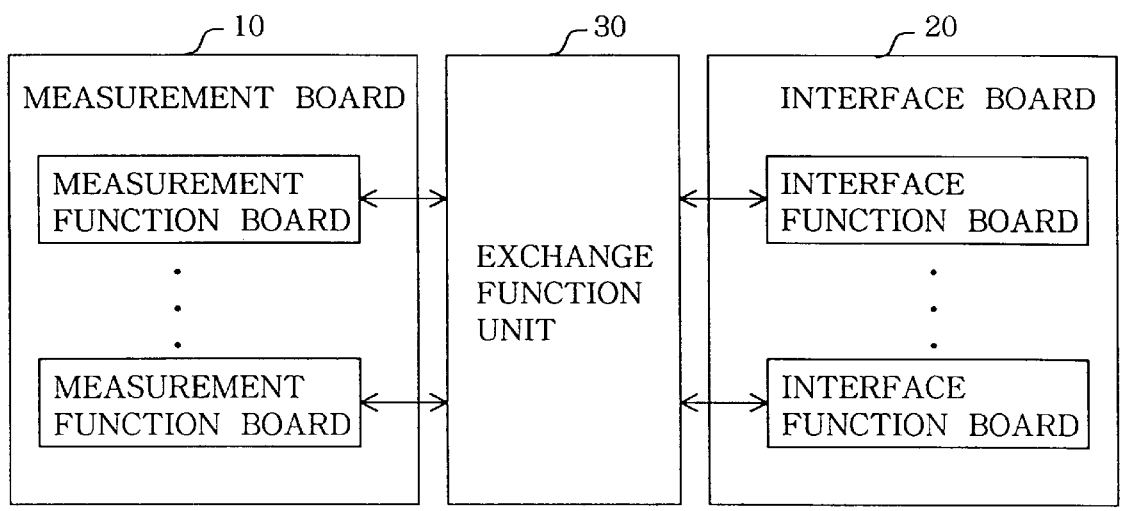
FIG. 3 is a block diagram showing one embodiment of a communication measurement device of the present invention.

FIG. 3 is a block diagram showing an embodiment of the communication measurement device of the present invention. In this figure, the measurement device for communication is made up of measurement board 10 having measurement function boards such as for bit error measurement functions or protocol testing functions, interface board 20 having various types of interface function boards, and exchange function unit 30 that establishes connections between these boards. Exchange function unit 30 may be set according to a test item to establish connections between each of the measurement function boards of measurement board 10, connections between each of the interface function boards in interface board 20, and connections between each of the measurement function boards of measurement board 10 and each of the interface function boards of interface board 20.

In the above-described exchange function unit 30 of this communication measurement device, for example, a plurality of measurement function boards within measurement board 10 may be connected to one interface function board within interface board 20, a plurality of interface functions within interface board 20 may be connected to one measurement function within measurement board 10, or a plurality of measurement functions may be operated simultaneously or separately. In this way, the present invention allows, for example, compound testing in an ISDN line such as determining at a signaling channel whether a data channel is being correctly controlled.

An embodiment is proposed that allows, in tests of a communication device, simulation and associated monitoring as well as voice monitoring in an HDLC (High Level Data Link Control) in an ISDN line, and R/V. 110 monitoring in a public network exclusive data line.

Figure 4:
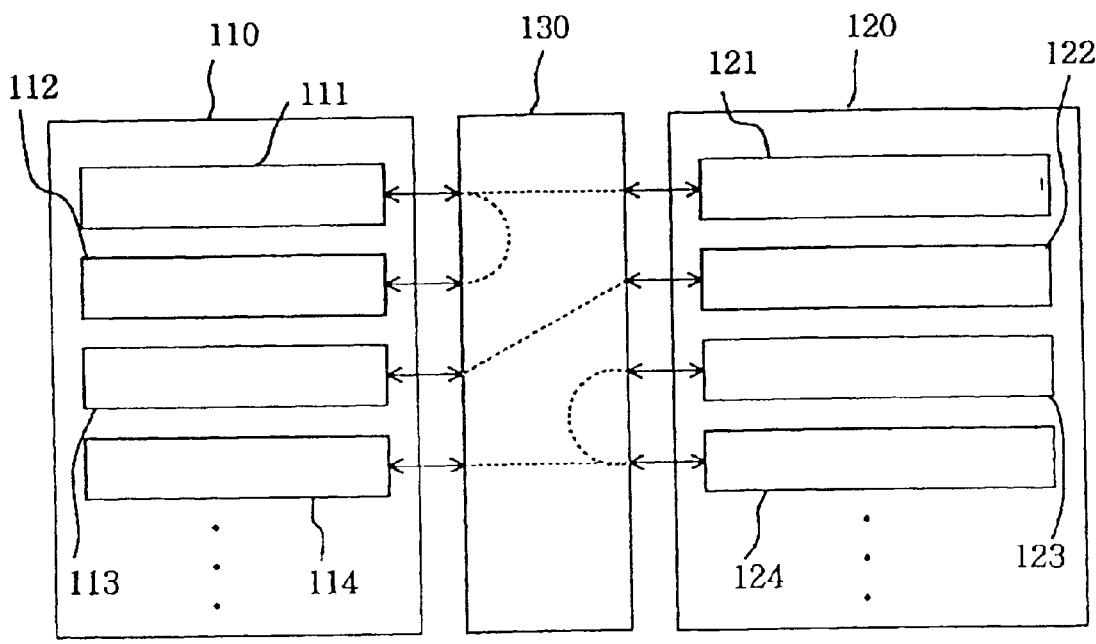
FIG. 4 is a block diagram showing the schematic construction of an embodiment of the communication measurement device of the present invention.

FIG. 4 is a block diagram showing a schematic view of the construction of one embodiment of a communication measurement device according to the present invention. In this figure, layer 2/3 board (measurement board) 110 is provided with HDLC simulator 111, HDLC monitor 112, voice monitor 113, and R/V. 110 monitor 114 as measurement functions.

Layer 1 board (interface board) 120 is provided with interface (I. 431) 121 and interface (I. 430) 122 for establishing connections with an ISDN line, and interface (X. 21) 123 and interface (V. 35) 124 for establishing connections with a public network exclusive data line.

Measurement data bus 130 constitutes the exchange function unit and connects layer 2/3 board 110 and layer 1 board 120. In this case, this measurement data bus 130 effects data transfer between each of interface (I. 431) 121 and HDLC simulator 111; HDLC simulator 111 and HDLC monitor 112; interface (I. 430) 122 and voice monitor 113; interface (X. 21) 123 and interface (V. 35) 124; and interface (V. 35) 124 and R/V. 110 monitor 114.

Measurement data bus 130 has, for example, a bus width of 8 bits, a transfer clock speed of 4.096 MHz, and a frame frequency of 8 KHz. The bus frame is divided into 512 time slots, one time slot allowing the transfer of data at 64 Kbps. The actual assignment function of time slots in this measurement data bus 130 is explained hereinbelow with reference to FIG. 5.

Figure 5:
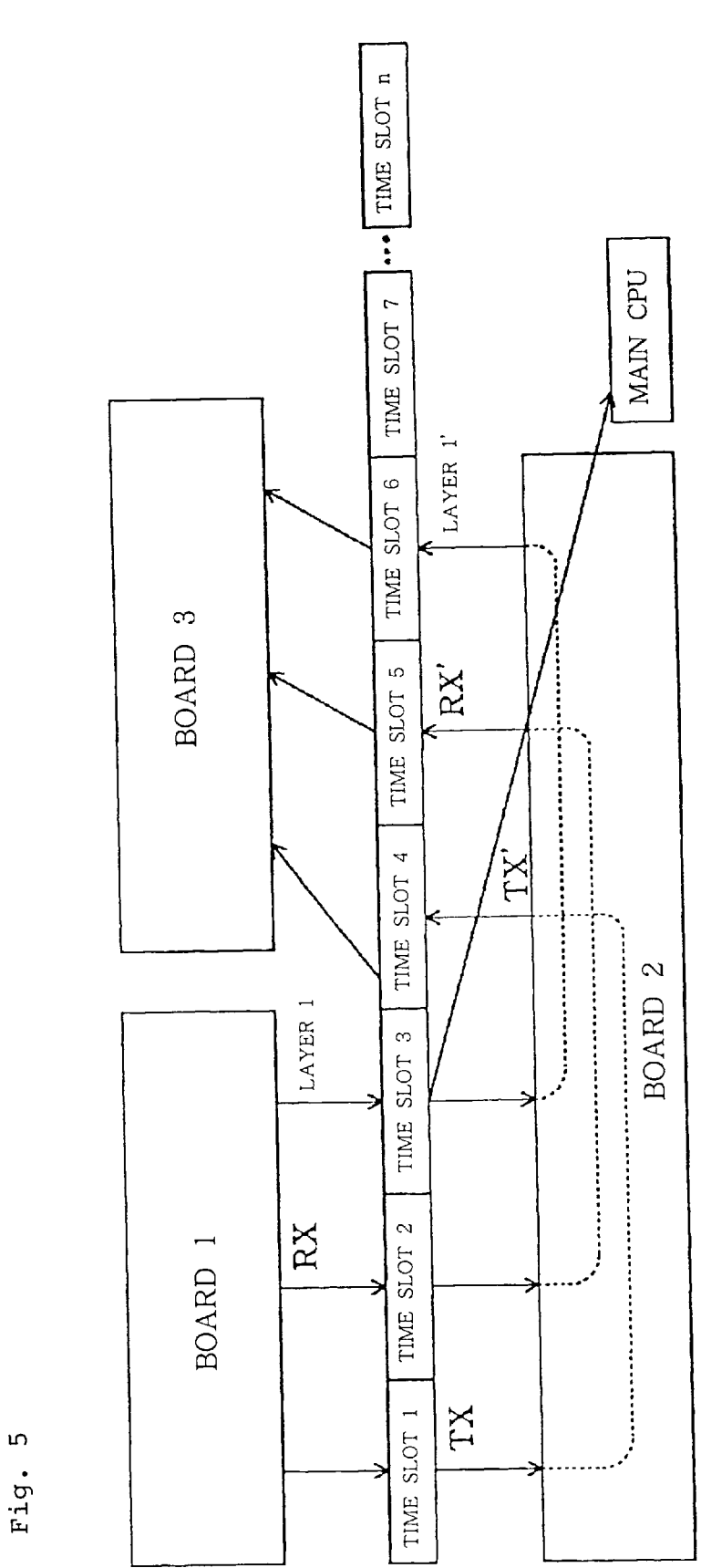
FIG. 5 is an explanatory view of the actual time slot allotment function in the measurement data bus shown in FIG. 4.

FIG. 5 is an explanatory view of the time slot assignment function of measurement data bus 130. In this figure, boards 1–3 correspond to each interface function and each measurement function.

Board 1 outputs TX data (transmission) to time slot 1, RX data (reception) to time slot 2, and layer 1 information to time slot 3.

When data are outputted to time slots 1–3, board 2 reads the TX data of time slot 1 and the RX data of time slot 2, converts these data to TX' data and RX' data, respectively, and outputs the result to time slots 4 and 5, respectively. In the same way, the layer 1 information of time slot 3 is converted to layer 1' information and outputted to time slot 6.

Board 3 reads the data of time slots 4 and 5 and stores it to, for example, a capture memory. The layer 1 information of time slot 3 is read by board 2, read to main CPU, and used in processing by the main CPU.

As described hereinabove, measurement data can be freely transferred between each of the boards by the measurement data bus.

One time slot in the above-described measurement data bus gas the transfer capability of 64 Kbps. By using two of these time slots, data can be transferred at 128 Kbps. The table below shows the relation between the number of time slots employed and transfer speeds above 64 Kbps.

TABLE 1

| TRANSFER SPEED (Kbps) | NUMBER OF TIME SLOTS | TRANSFER SPEED (Kbps) | NUMBER OF TIME SLOTS |
|---|---|---|---|
| 64 | 1 | 768 | 12 |
| 128 | 2 | 1,536 | 24 |
| 192 | 3 | 1,920 | 30 |
| 384 | 6 | 2,048 | 32 |

When transferring data other than asynchronous data at less than 64 Kbps, one time slot is again occupied, and in such a case, two transfer modes (transfer formats) based on a transfer speed series can be used as appropriate.

Figure 6:
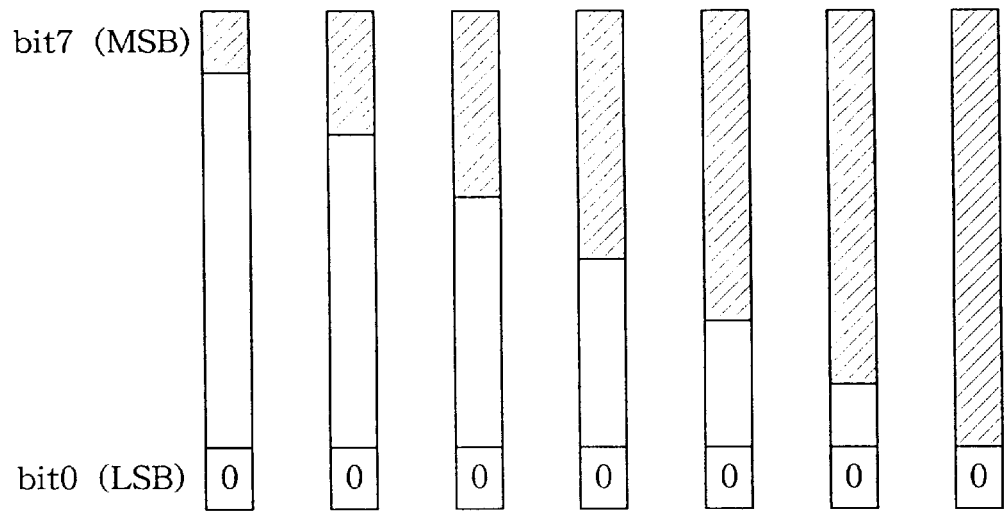
FIG. 6 shows the switching state of each transfer speed in 8 Kbps data transfer.

One format is a 8 Kbps data transfer format, and is used at transfer speeds of 8, 16, 24, 32, 40, 48, and 56 (Kbps). This format switches transfer speed according to how many bits of the 8-bit bus width are used, and switching can be effected as shown in FIG. 6.

Figure 7:
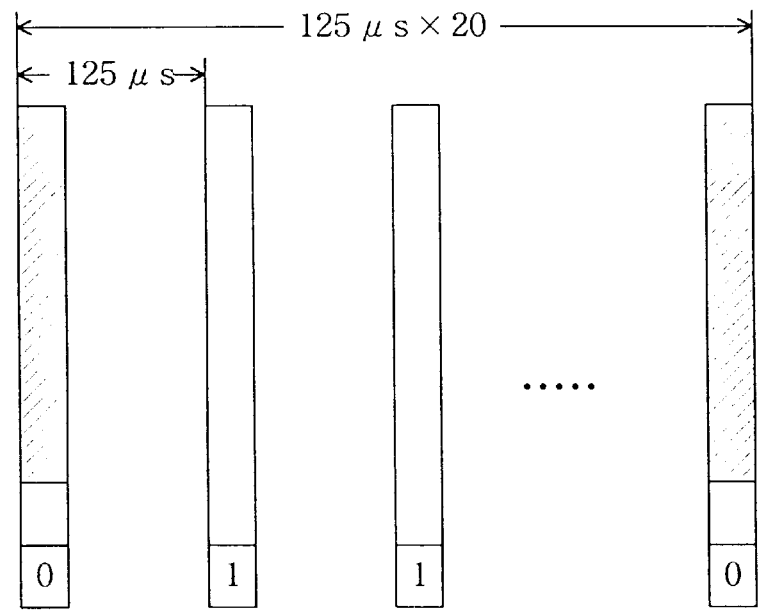
FIG. 7 shows the switching state of each transfer speed in 2 and 4 Kbps data transfer.

The other format is a 2.4 Kbps data transfer format. 2.4 Kbps-series data is a transfer speed used chiefly in synchronous data communication. This format takes the 48-Kbps format of the 8-K series as the basic format, and is a format in which the insertion frame intervals of effective data are switched by the transfer speed. In concrete terms, switching of insertion frame intervals is effected in a form such as shown in FIG. 7. In this case, a speed of 48K (·20=2.4 Kbps is achieved if effective data is present in one in 20 frames. The table below shows the relation between the average effective frame cycle n and transfer speed.

TABLE 2

| n | TRANSFER SPEED (bps) | n | TRANSFER SPEED (bps) |
|---|---|---|---|
| 1.25 | 38,400 | 10 | 4,800 |
| 1.6666667 | 28,800 | 20 | 2,400 |
| 2 | 24,000 | 40 | 1,200 |
| 3.33333333 | 14,400 | 80 | 600 |
| 5 | 9,600 | 160 | 300 |

An asynchronous data transfer method effected by means of the measurement data bus will next be explained.

Asynchronous data are transferred by a multipoint sampling format. The sampling speed is an integer power of 64 KHz, and a speed that is at least ten times the nominal data speed is selected. For example, an asynchronous data sampling speed of 28.8 Kbps requires a level at least ten times greater, or 288 KHz or more. 288 (64=4.5, and as a result, sampling is carried out at 320 KHz (or five times 64 KHz). Data that are sampled at this speed are transferred using five time slots in the measurement data bus.

Figure 8:
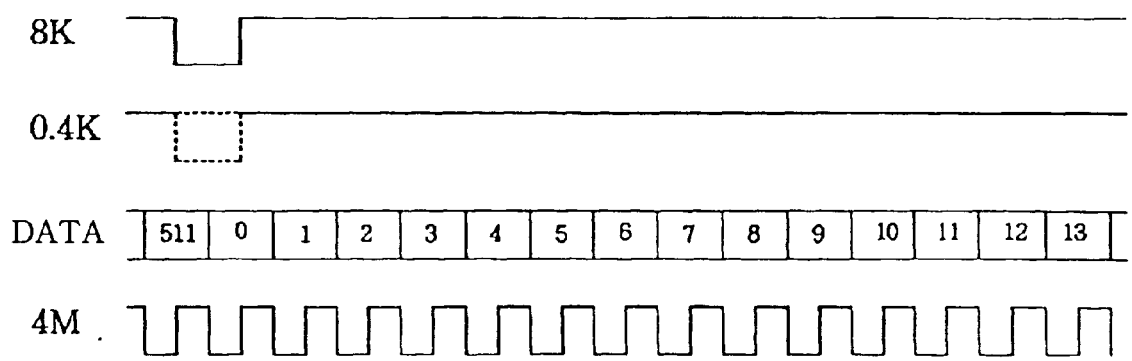
FIG. 8 is a timing chart showing time slot assignment and timing control signals in a measurement data bus.

Explanation will next be given regarding the control signals and timing of the measurement data bus. As shown in FIG. 8, the measurement data bus is made up of an 8-bit data bus and a number of timing control signals. In the figure, each number of the data indicates the time slot number. In addition, the timing of the 0.4K signal is such that it is outputted once in every 20 frames. Moreover, a rate clock for the layer 1 board is also present on the measurement data bus in addition to the abovedescribed control signals.

As described hereinabove, the construction of the communication measurement device of this embodiment includes a common data exchange function between each measurement function board and each interface function board, whereby this embodiment has the following features:

(1) measurement of a plurality of test items is possible for one interface;

(2) one measurement item can be realized at a plurality of interfaces;

(3) an artificial exchange function can be realized by controlling connection between interface boards;

(4) new measurement function boards can be added; and (5) special data formats can be accommodated.

Figure 9:
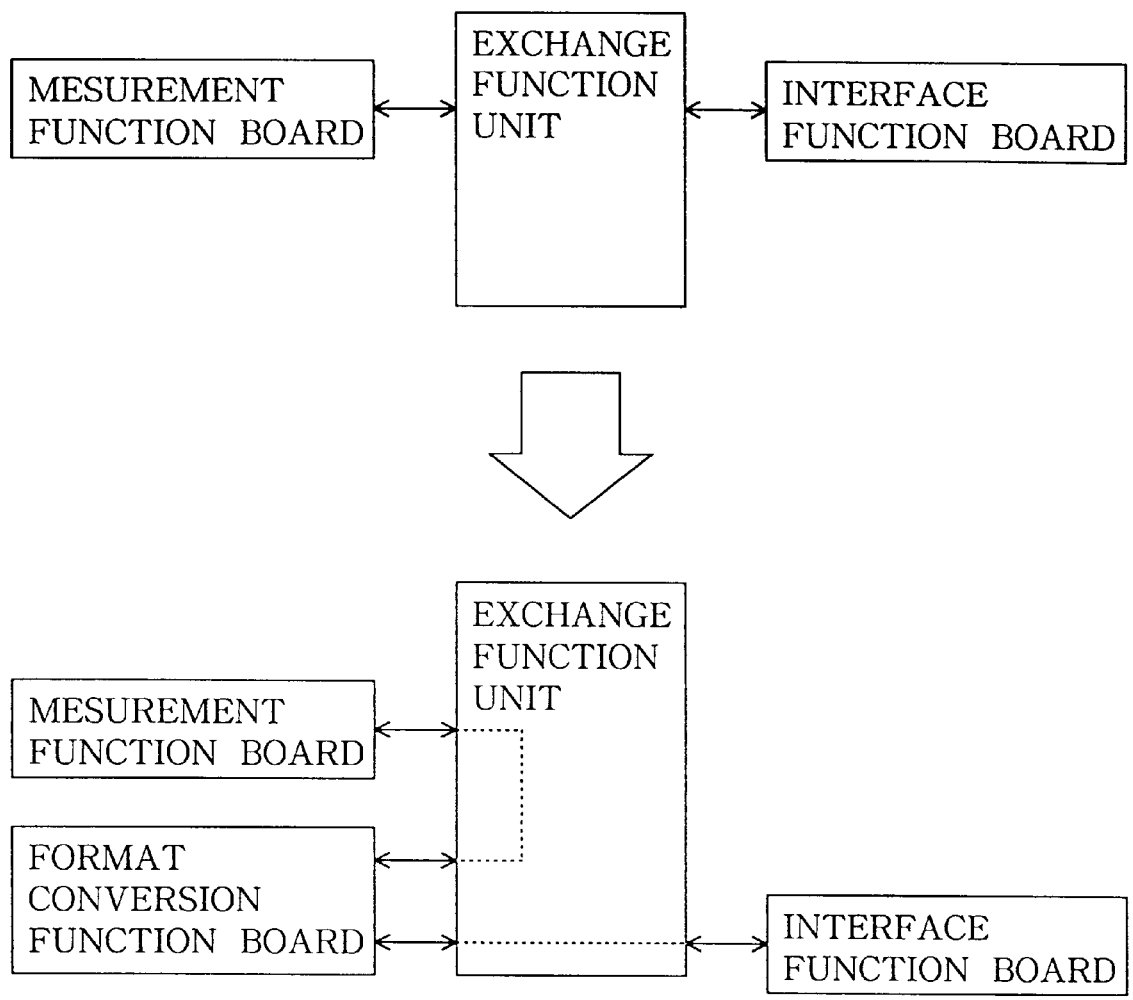
FIG. 9 is an explanatory view of an application to special data format.

Here, the fifth feature described, i.e., the accommodation of special data formats, allows, for example, an application by which, as shown in FIG. 9, in a construction in which measurement function board 10*a* and interface function board 20*a* are connected by exchange function unit 30, format conversion function board 10*b* can be added and measurement enabled by way of board 10*b*.

Other Embodiments

By providing on the measurement board side an interface function to an exchange function for uses such as remote control in addition to measurement, each measurement function in the measurement board can be controlled from the outside through the use of, for example, interface (I. 431).

Figure 10:
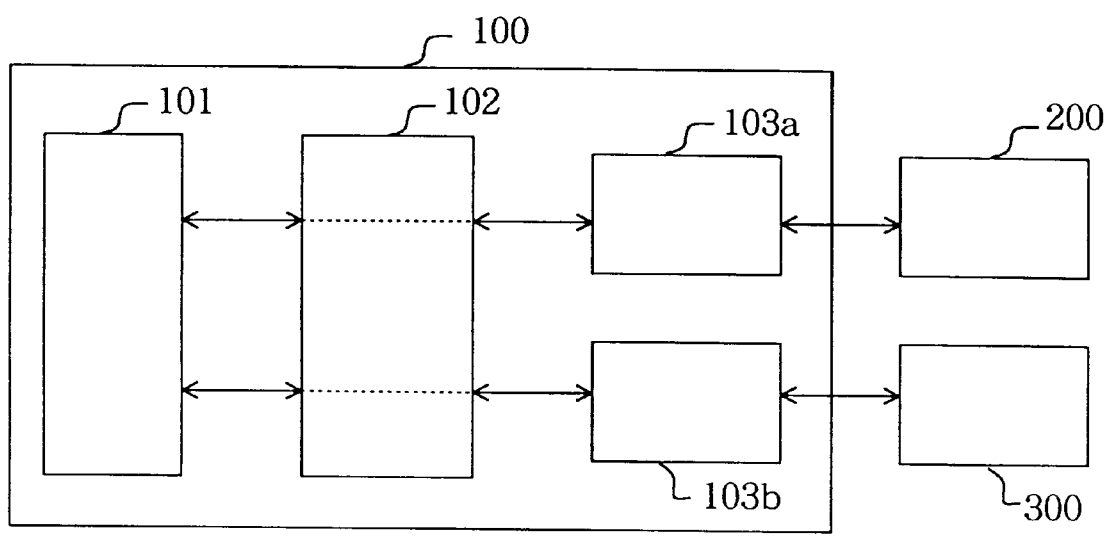
FIG. 10 is a block diagram showing the schematic construction of a communication measurement device capable of remote control, which is another embodiment of the present invention.

For example, as shown in FIG. 10, communication measurement device 100, is connected with measurement function controller 200 and an object of measurement (communication device) 300. Communication measurement device 100 is constructed such that measurement function board 101 and interface function boards 103*a* and 103*b* are connected by exchange function unit 102. Each of, interface function boards 103*a* and 103*b* are interfaces (I. 431, I. 430) used in, for example, an ISDN line. Interface function board 103*a* is connected with measurement function controller 200, and interface function board 103*b* is connected to the object of measurement 300. Measurement function board 101 is provided with each of the various measurement functions for test measurements of the object of measurement 300, and in addition, is provided with a processing function to allow, for example, mutual communication with measurement function controller 200 using, for example, interface (I. 431). In this way, measurement function controller 200 can control the functions of measurement function board 101.

In a measurement device for communication constructed according to the foregoing description, an object of measurement 300 can be measured using measurement function board 101 by remote operation from measurement function controller 200 by way of an ISDN line.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A measurement device for communication that determines communication quality of a communication device making up a communication system by way of communication lines, comprising:

an interface function board that regulates connections with said communication device by way of said communication lines;

a plurality of measurement function boards provided for a plurality of test items for said communication device, wherein each one of said plurality of test items performs a test on said communication device and at least two of said test items are different from one another; and an exchange function unit that connects said interface function and said plurality of measurement function boards, wherein said exchange function unit provides compound testing of said communication device by said at least two different test items.

2. A measurement device for communication according to claim 1 wherein said interface function board is made up of a plurality of interface function boards provided corresponding to the types of communication lines, and said exchange function unit establishes connections between each interface function board and each measurement function board according to test items.

3. A measurement device for communication according to claim 1 constructed so as to allow addition of a measurement function board equipped with new measurement functions, said exchange function unit establishing connections between said added function board and said interface function boards.

4. A measurement device for communication according to claim 1 further comprising a function board provided with interface functions that, using said interface function boards, receive control signals inputted from the outside for controlling communication tests by each of said measurement function boards; and constructed so as to enable remote control from the outside by means of said control signals.

5. The measurement device of claim 1, wherein said exchange function unit provides compound testing of said communication device by time division multiplexing connectivity to said interface function board between at least two measurement function boards corresponding to said at least two different test items.

* * * * *